United States Patent Office 2,962,434
Patented Nov. 29, 1960

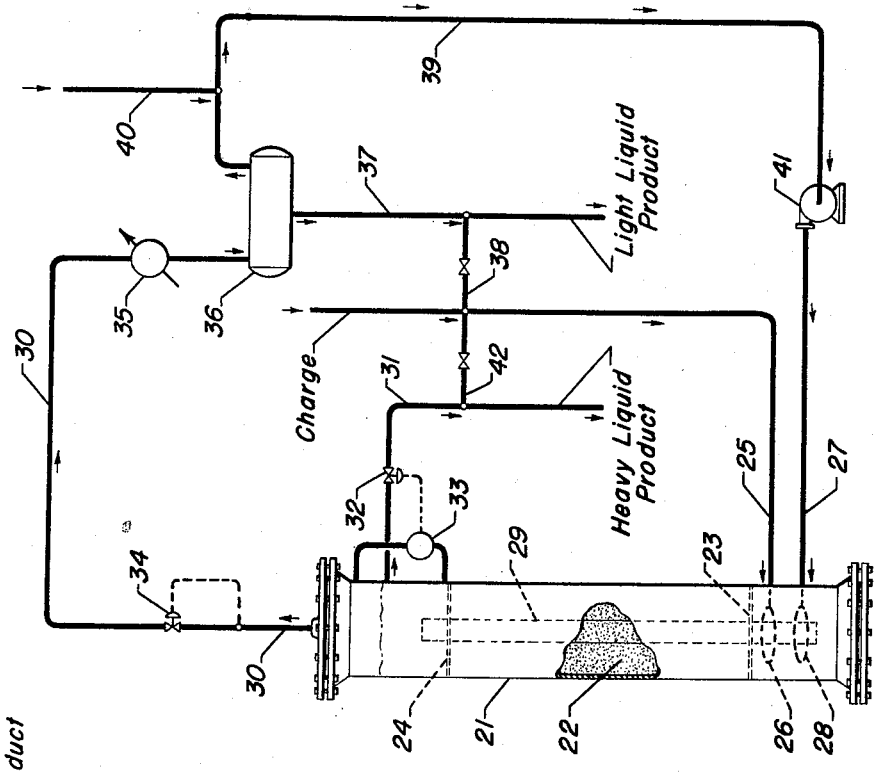
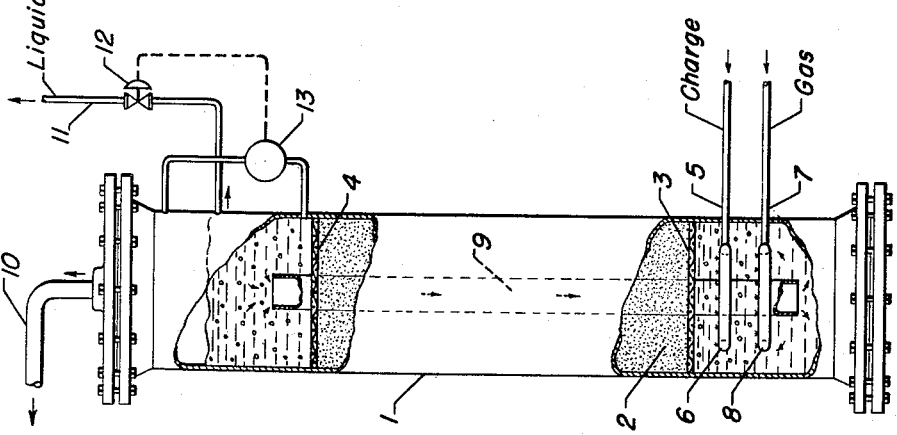

2,962,434

PROCESS FOR EFFECTING EXOTHERMIC REACTIONS BETWEEN LIQUIDS AND GASES

Jack B. Pohlenz, Riverside, Ill., assignor, by mesne assignments, to Universal Oil Products Company, Des Plaines, Ill., a corporation of Delaware Filed Mar. 12, 1958, Ser. No. 720,875

4 Claims. (Cl. 208—108)

This invention relates to a process for effecting exothermic reactions between liquids and gases and to a reactor assembly which is peculiarly adapted for performing the process.

In many applications it is desirable or necessary to effect exothermic reactions between liquids and gases. To cite a few characteristic examples, liquid organic compounds may be hydrogenated, liquid olefinic or aromatic compounds may be alkylated with gaseous or vapor phase isoparaffinic compounds, high molecular weight organic molecules may be hydrocracked to form saturated lower molecular weight organic compounds, organic compounds may partially oxidize to form their oxygen derivatives, etc.

Exothermic processes are characterized by a temperature rise which is due to the heat of reaction. In batch processes, the temperature rise is manifested as a general increase in temperature of the entire reacting mass and in continuous processes where the reaction is taking place in a flowing stream, the temperature rise is characterized by a gradient or temperature rise across the reaction zone. This causes exothermic reactions in continuous or flowing processes to be effected at least partly at less than optimum conditions. For example, in a flowing continuous exothermic reaction, if the inlet temperature to the reaction zone is proper, the outlet temperature will be too high or conversely, if the outlet temperature of the reaction zone is proper, the inlet temperature will be too low. More important, exothermic reactions frequently result in undesirable thermal side reactions which cause such difficulties as coking or decomposition of product or reactants.

In many exothermic reactions, the process is advantageously performed with a catalyst which increases the reaction rate or which permits the reaction to be effected at a reasonable rate at a low temperature. Catalysts frequently permit reactions to occur in commercial quantities where they otherwise could not because without a catalyst the reaction would have to be effected at a temperature in excess of a reactant decomposition temperature to obtain a reasonable reaction rate. Using a catalyst in many cases will also permit a reaction to be effected at a reasonable rate at a lower temperature where equilibrium is more favorable to the production of the product. In many catalytic processes, heterogeneous catalyst in the form of solid particles is employed. Heterogeneous catalysis is so advantageous that it is in wide-spread commercial use. Heterogeneous catalysts are preferably employed as fixed beds of particles which are easy to contact with reactants and which eliminate moving solids and subsequent solid-fluid separation problems.

To combat the temperature difficulties of effecting exothermic reactions in continuous flowing catalytic reactors, many expedients have been devised. One is the use of internal cooling coils in the reaction zone to remove the exothermic heat of reaction and thereby prevent a large temperature gradient. This method is costly because of the difficulty of fabricating internal cooling coils in a catalytic reaction zone, it is inefficient because the cooling is local and not homogeneous, it is expensive because heat must be introduced to initiate the reaction and then must be removed to prevent runaway temperatures and because it requires procuring and handling a cooling medium. Another expedient to moderate temperatures is to install a stirrer in the reaction zone to produce thorough mixing of the reacting mixture thereby intimately commingling the hot material which has reacted with the cool material being introduced. Although internal mixers produce good results, they are very difficult to maintain mechanically, they do not permit the use of a fixed catalyst bed and they allow short circuiting of charge directly to the outlet point of the reactor. It is an object of this invention to provide a special process and apparatus for maintaining moderate conditions within a reaction zone in which an exothermic reaction is being effected.

It is an embodiment of this invention to provide a reactor assembly comprising in combination a shell, a fixed catalyst bed, an open-ended conduit extending from above to below said catalyst bed, a charge inlet below said catalyst bed, a gas inlet below said catalyst bed, a vapor outlet from the upper portion of said shell and a liquid outlet from the upper portion of said shell at a point higher than the top of said open-ended conduit.

In another embodiment, this invention relates to a process for effecting exothermic reactions between liquids and gases comprising introducing said liquid and said gas below a bed of catalyst which promotes the reaction between the two, passing a mixture of liquid and gas upwardly through said catalyst bed and passing at least a portion of the effluent from said catalyst bed to the inlet thereof.

Briefly, this invention involves the use of an open-ended centerpipe or its equivalent, within a reactor shell in combination with an aerated reaction mixture passing upwardly through a fixed or fixed fluidized catalyst bed so that the liquid material in the centerpipe is denser than the aerated material in the catalyst bed and in open communication with it. The combination of a more dense recycle stream which is created by the peculiar apparatus of this invention with the less dense main process stream provides many advantages over other forms of reactors known to the art. The difference in density between the material in the catalyst bed and the material in the centerpipe causes continuous and rapid circulation of the material through the centerpipe which dilutes the cold charge material with the hot reacted material. The effect of this circulation is to remove heat from the exothermic reaction zone by raising cold feed to the reaction initiating temperature. This not only provides efficient homogeneous direct heat exchange, but it also eliminates the necessity of adding energy to a cold feed and the necessity of removing heat from the reaction zone. The combined feed of fresh feed and recycle has a far greater ability to absorb the heat produced than the feed itself and accordingly can absorb the heat of reaction without experiencing so great a temperature rise. This moderating of the temperature gradient or effecting the process at more isothermal conditions is accomplished without internal stirring thereby avoiding the difficult mechanical problems of stirred reactors. Besides the obvious advantage of having no moving mechanical parts within the reactor, a great advantage in high pressure applications, the use of the process and apparatus of this invention permits the reaction to be promoted with a fixed or fixed-fluidized catalyst bed and, in addition, insures that all of the charge must be subjected to treatment with catalyst at reaction conditions at least once before leaving the reaction zone.

This invention requires the use of a fixed catalyst bed or a fixed-fluidized catalyst bed. The catalyst contemplated for use is a particle-form catalyst in the form of spheres, cylinders, saddles, pellets, etc., which have a major dimension of from about ⅛" to about 1" or greater. Since the upward flow of gas through the reaction zone is an essential element of this invention, the catalyst particles should be shaped to avoid trapping gas bubbles as much as possible. The preferred shape for the particles accordingly is spherical. The catalyst is contained on a screen or grid below the bed and it may also have a screen above the bed so that catalyst cannot escape into the effluent stream. The invention contemplates that the reactants pass upwardly through the catalyst bed and, therefore, the catalyst may be in a fluidized state so that all particles are in relative motion with each other but never leave the confines of the bed. When the upward flow of fluid through the bed is slow enough and when the particles are large enough and dense enough, they may remain in static contact with each other during processing. The catalyst will, of course, be selected to promote the reaction being effected and catalysts will usually consist of a catalytic material supported on a porous inorganic oxide support. For hydrocracking reactions, the support may consist of a material having cracking activity such as alumina, silica, silica-alumina, silica-zirconia, alumina-halogen, etc. upon which a material having hydrogenating activity, such as platinum, palladium, nickel, cobalt, molybdenum, etc., is disposed. Since these catalysts are well known and do not form part of this invention, it is intended that any suitable hydrocracking catalyst which is known to the art may be used. Similarly, catalysts such as nickel on silica or other hydrogenating catalysts may be used to promote hydrogenating reactions, supported aluminum chloride may be used to promote alkylation reactions, etc.

The charge to the process will also be appropriate to the process effected. When it is desired to effect hydrocracking of hydrocarbon fractions, the charge may be heavy hydrocarbon fractions such as gas oils, heavy gas oils, other heavy distillates or residue fractions. The gas charged to the reaction zone will be hydrogen or mixtures of hydrogen with other gases such as methane, carbon monoxide, etc. When it is desired to hydrogenate a liquid charge such as an unsaturated edible oil, the charge to the reactor will, of course, be the oil to be hydrogenated and hydrogen from any suitable source.

As stated above, the reaction zone consists of an external shell in which a catalyst bed is maintained with means for introducing liquid charge and gas below the catalyst bed and with means for removing liquid product and gas from above the catalyst bed. Within the reactor, or at least forming an integral part of the reactor, is an open-ended conduit connecting from above to below the catalyst bed which is shielded from the incoming gas stream so that the liquid in the open-ended conduit will not be aerated. The shielding may be accomplished with baffles or the like or it may be accomplished simply by extending the pipe below the gas inlet. The conduit may be centrally disposed within the reactor as a centerpipe or it may consist of a chordal segment or it may even be disposed outside of the internal shell and with the last modification, it may contain a valve or other adjustable orifice means for regulating the rate of material flow therethrough. Although it is preferred that the liquid and gas introduced into the bottom of the reaction zone are introduced in subdivided form, they may be simply pumped into the reaction zone or they may be pumped through suitable grids, spray heads, perforated conduits, etc.

The process and apparatus of this invention may be best described with reference to the accompanying drawings which illustrate in Figure 1 a sectional view of the reaction zone of this invention and in Figure 2 a schematic view of the reaction zone of this invention with the associated equipment necessary for effecting the process. In Figure 1 there is shown the reaction zone of this invention which consists of an outer shell 1, a catalyst bed 2 maintained between screens 3 and 4 and a centerpipe 9 disposed concentrically within the annular shaped catalyst bed. The reaction zone has a conduit 5 for introducing liquid charge through distributor 6 and a conduit 7 for introducing gas through distributor 8. In the upper portion of the reactor assembly, there is a conduit 10 for removing vapor product and a conduit 11 for removing liquid product at a rate regulated by valve 12 which operates responsive to the level in the reaction zone through level controller 13. The open-ended conduit 9 must either extend below the gas inlet 8 or it must be shielded so that gas from the inlet cannot enter the conduit thereby maintaining the liquid phase within the conduit denser than the aerated liquid passing through catalyst bed 2. It is also critical that the upper open-end of conduit 9 is below the liquid outlet 11 so that conduit 9 is always full of liquid.

Figure 2 illustrates the reactor assembly of this invention with the associated equipment necessary for effecting a process. For purposes of this explanation and without intention of limiting the invention, the process and apparatus will be described in relation to hydrocracking a residual petroleum fraction to produce low boiling distillates. The process and apparatus of this invention are extremely well adapted to this process since the temperature-moderating effect of the recycle stream in conjunction with the abundance of hydrogen cause saturation and stabilization of products before undesirable thermal reactions, such as coking, which deactivate the catalyst, can occur. A charge of topped crude boiling in excess of 650° F. and obtained from removing all lower boiling material from a petroleum crude is introduced via line 25 into the lower portion of reactor 21 through a distributor 26 which causes the charge to be homogeneously distributed across the cross section of the reactor. Hydrogen-containing gas is introduced through line 27 and distributor 28 in quantities to supply at least 1000 standard cubic feet of hydrogen per barrel of charge. The hydrogen, which may contain diluent gases to be hereinafter described, rises as bubbles through the rising column of liquid charge and at a faster rate to produce a mixed liquid-vapor stream passing upwardly through catalyst bed 22. Catalyst bed 22 consists of cobalt and molybdenum deposited upon porous alumina. The catalyst preferably contains about 3% cobalt and about 5% molybdenum by weight in the form of the oxide or sulfide. The charge is introduced at 500° F. and is commingled with hot recycled liquid at 840° F. discharging from the lower portion of conduit 29 at such a rate as to provide 16 volumes of circulating liquid for each volume of feed. The mixture of charge and hot liquid results in a rising liquid stream at a temperature of 820° F. By the time the liquid reaches the catalyst bed, it is saturated with hydrogen and at reaction conditions so that all unsaturated material is hydrogenated and a large portion of the molecules of the liquid are cracked and hydrogenated to form saturated lower boiling compounds. As the material passes through the catalyst bed, the temperature rises and even greater quantities of cracking and hydrogenating occur, however, because the recycle rate is so large the conversion per pass is small resulting in a moderate temperature rise of 20° F. through the reaction zone. Upon leaving the catalyst bed through screen 24, the product separates into a vapor phase and a liquid phase. The vapor phase is removed through line 30 and pressure control valve 34 and it is cooled in cooler 35 to remove any condensable liquids therefrom. In receiver 36 a light liquid product fraction is separated from a hydrogen-containing gas fraction and the latter which may contain light hydrocarbons, carbon dioxide, carbon monoxide, etc. is at least partly passed through line 39 and pump 41 into the before-mentioned line 27. The hydrogen that is consumed is replaced from an independent hydrogen source entering the system through line 40. The light liquid product is withdrawn from receiver 36 through line 37 and may be totally recovered as product or it may be partially recovered and partially returned to the reaction zone through line 38 and line 25. When returned to the reaction zone, the light liquid product may act as a diluent for the charge and as a heat absorbing medium which not only absorbs sensible heat but latent heat of vaporization inasmuch as it is vaporized at the high temperatures within the reaction zone. The boiling range of the recycle material may be adjusted so that it will vaporize mostly on the upper portion of the catalyst bed thereby removing heat from the hottest zone.

The vaporization of this light recycle stream will also increase the degree of aeration in the catalyst bed thereby stimulating the circulation through the centerpipe. The liquid product from the process passes from reactor 21 through line 31 and valve 32 which in turn adjusts the flow rate through line 31 responsive to the level within reactor 21 which is sensed by level controller 33. The heavy liquid product may be passed to a fractionator and separated into material boiling below 650° F. and unconverted material, it may be totally recovered as product or it may be partially returned to the charge via line 42 and line 25. By maintaining the liquid level above the upper end of conduit 29, there is a continuous flow of liquid product through line 29 to a position below the bottom of the catalyst bed. The flow of this hot liquid, as heretofore stated, causes the fluid in reactor 21 to circulate rapidly through the catalyst bed many times, thereby moderating the temperature within the catalyst bed and permitting exothermic reaction heat to be absorbed as sensible heat in the charge.

As heretofore stated, a topped crude, when introduced into the bottom of reaction zone 21 and commingled with sufficient recycled material from conduit 29 to raise the temperature of the mixture to 820° F., under a pressure of 1500 p.s.i and with at least 1000 standard cubic feet of hydrogen per barrel of charge will experience a net conversion of about 40% based on the weight of product boiling below 650° F. compared with the weight of charge. When operated in accordance with the process of this invention, there is obtained a saturated product and there is greatly reduced coke formation on the catalyst over the usual methods of conversion so that the process may function for a prolonged period without changing or reactivating the catalyst.

The reactor conditions at the catalyst bed outlet may be correlated so that the light liquid product resulting from the process will be in vapor phase. When the process is so controlled, the only portion of the catalyst bed effluent that is returned to the inlet of the bed will be the unconverted portion, over-conversion of the light product is avoided and the need for fractionating the heavy liquid product is avoided. It is preferred to remove all of the converted material from the reaction zone in the vapor phase and it is therefore preferred to control the temperature and pressure of the catalyst bed effluent at conditions that will maintain the portion of the effluent boiling below the initial boiling point of the charge in the vapor phase. Besides the obvious advantages of avoiding over-conversion and fractionation, operating to recover all product in vapor phase permits a completely internal recycle stream to be used. This saves large quantities of hydrogen that would be lost if the recycle stream had to be produced by removing a hydrogen-rich liquid from the reactor and preparing the recycle stream by fractional distillation of that stream.

It is evident that the internal recycle rate through the open-ended conduit is an important element of this invention and it is contemplated as within the scope of this invention to control that rate by various means. For example, regulating the gas flow rate through the catalyst bed will control the circulation rate of the liquid in the open-ended conduit. It is preferred to have the open-ended conduit extend a substantial distance above the catalyst bed so that a zone of unobstructed aerated liquid may exist to thereby increase the difference in density between liquid in the open-ended conduit and in the reaction zone. To this end additional gas feed points above the catalyst bed may be employed so that the density of the column of liquid may be regulated without unduly disturbing the catalyst particles or the ratio of liquid to gas in the catalyst bed.

This invention provides a novel and useful method and means for effecting exothermic reactions in fixed or fixed-fluidized catalyst beds without mechanical stirrers and without high temperature problems. Liquid recycle is prepared with a bare minimum of fractionation facilities and hydrogen losses are reduced.

I claim as my invention:

1. An exothermic conversion process which comprises maintaining a confined bed of solid catalyst within a reaction zone, said bed being spaced from the top and bottom of said zone, introducing a liquid reactant and a vapor reactant into the space in the lower portion of the reaction zone below the catalyst bed, passing the resultant mixture of reactants upwardly through and exothermically reacting the same within the catalyst bed, separating the resultant reaction products into a liquid phase and a vapor phase in the space in the upper portion of the reaction zone above the catalyst bed, maintaining a body of the liquid phase in the last-mentioned space above the catalyst bed while removing a vapor phase effluent from the reaction zone above said liquid body, and continuously passing at least a portion of the liquid phase from said body above the catalyst bed downwardly into said space below the catalyst bed in an unaerated liquid column of greater density than said mixture of reactants passing upwardly through the catalyst bed.

2. A hydrocracking process which comprises maintaining a confined bed of solid hydrocracking catalyst within a reaction zone, said bed being spaced from the top and bottom of said zone, introducing a heavy hydrocarbon and hydrogen into the space in the lower portion of the reaction zone below the catalyst bed, passing the resultant hydrocarbon-hydrogen mixture upwardly through and exothermically reacting the same within the catalyst bed, separating the resultant reaction products into a hydrocarbon liquid phase and a hydrogen-containing vapor phase in the space in the upper portion of the reaction zone above the catalyst bed, maintaining a body of the liquid phase in the last-mentioned space above the catalyst bed while removing a vapor phase effluent from the reaction zone above said liquid body, and continuously passing at least a portion of the liquid phase from said body downwardly through but out of contact with the catalyst bed into said space below the catalyst bed in an unaerated liquid column of greater density than said hydrocarbon-hydrogen mixture passing upwardly through the catalyst bed.

3. The process of claim 1 further characterized in that the vapor phase effluent removed from the reaction zone is partially condensed and at least a portion of the resultant condensate is commingled with said liquid reactant being introduced to the reaction zone.

4. The process of claim 3 further characterized in that at least a portion of the uncondensed vapor phase effluent is recycled to the lower portion of the reaction zone.

References Cited in the file of this patent

UNITED STATES PATENTS

| | | |
|---|---|---|
| 2,706,167 | Harper et al. | Apr. 12, 1955 |
| 2,709,675 | Phinney | May 31, 1955 |
| 2,863,823 | Moser | Dec. 9, 1958 |
| 2,885,342 | Keith | May 5, 1959 |